UNITED STATES PATENT OFFICE.

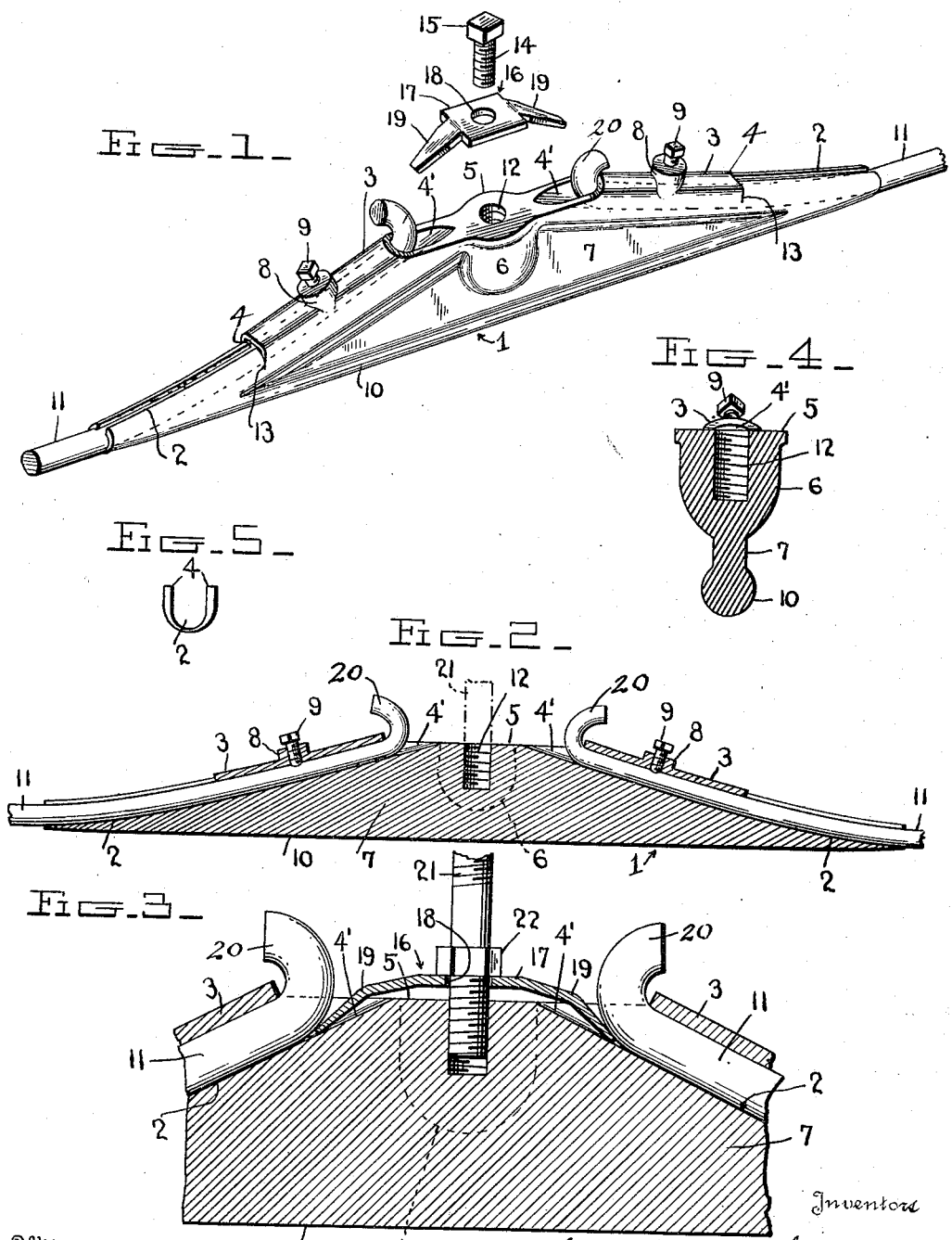

GEORGE W. ROBINSON, OF BALTIMORE, AND MILTON E. HARDING, OF ODENTON, MARYLAND.

COUPLING OR SPLICE FOR TROLLEY-WIRES.

1,132,388. Specification of Letters Patent. Patented Mar. 16, 1915.

Application filed May 12, 1914. Serial No. 838,134.

*To all whom it may concern:*

Be it known that we, GEORGE W. ROBINSON and MILTON E. HARDING, citizens of the United States, residing at Baltimore, Maryland, and Odenton, in the county of Anne Arundel and State of Maryland, respectively, have invented certain new and useful Improvements in Coupling or Splice for Trolley-Wires, of which the following is a specification.

This invention relates to improvements in a splice or coupling for trolley wires.

The object of the invention is to provide a coupling in which there will be a smooth under-run for the trolley, and one wherein a trolley wire is not exposed to the trolley underneath the coupling.

Another object of the invention is to so construct the coupling that the broken ends of the trolley wire may be fed through it in a substantially straight line, thus avoiding the sharp bends or curves which are disastrous to the wire, on account of its comparatively delicate condition near the point of breakage.

Another object of the invention is to so construct the coupling that the raw edges of its clamping ends will be at the top of the wire, thus avoiding the pitting and deterioration of the coupling near its ends, as is the case with couplings now in use.

A still further object of the invention is to provide a very simple and efficient means for locking the ends of the wire in the coupling where they are bent above the sleeves of the coupling, the means consisting of a peculiarly constructed wedge adapted to have portions wedged beneath the ends of the wires by a downward pressure brought about by suitable means.

It is well known that where there is a rough under-run in the coupling from any cause whatever, bouncing of the trolley occurs. This results in sparking which anneals or softens the wire and also the coupling adjacent to the uneven surfaces. In couplings in common use, the wear on the edges of the clamping ends of the coupling is at the bottom and the wire and lower raw edges of the clamping ends are exposed to the trolley, so that when the trolley engages the end of the coupling, there is a bounce and another or others, when the trolley runs off the exposed wire adjacent to the ends of the coupling. In a short time, this pits and serrates and wears away the coupling, adjacent to its ends, further exposing the wire and increasing the uneven surfaces which produces additional and greater sparking with consequent more rapid deterioration of the wire and coupling. In ordinary couplings there is a marked additional disadvantage in that the boss used for attachment of the coupling to the supporting wire in catenary work, extends so high that it interferes with feeding the wire straight in to the coupling ends, thus making it necessary to bend the wire to avoid the boss, which bending tends to weaken or break the already comparatively delicate or softened ends of the wire.

We completely overcome the practical objections above indicated and provide a coupling wherein there is a straight under-run with no exposure of the wire at its under side of the coupling, there being a perfectly smooth surface beneath the clamping ends, thus avoiding serrating or burning away and preventing injury to the wire, which, in our construction, is completely protected by the under surface of the coupling adjacent its ends. The tubular ends of the coupling are arranged upon a very gradual angle, so that in feeding or drawing the broken ends of the wire through the coupling, it will be pulled upon such a gradual curve, that chance of breaking is reduced to a minimum, the wire remaining in condition where it can be bent over the upper ends of the sleeves of the coupling without danger of breaking.

From the following description, the above and other advantages of the construction will at once become obvious to those skilled in the art.

In the drawings—Figure 1 is a perspective view of a coupling or splice, constructed in accordance with our invention, showing the wires held in the coupling preparatory to being positively secured therein by our additional wedging or clamping means, the wedge and bolt for operating it being in juxta-position to the coupling. Fig. 2 is a vertical sectional view of the coupling, the wedge being omitted. Fig. 3 is a broken vertical sectional view of so much of the coupling as is necessary to show the clamping wedge in final position, there being shown in this view, a hanger-rod usually employed in supporting the coupling in catenary work. Fig. 4 is a transverse central sectional view of the splice; and Fig. 5 is a view of the extreme end of the coupling showing the sides of the trough in normal position, or in position before it is bent or folded over the wire.

Referring to the drawings, the numeral 1 designates the coupling, the tubular ends of which are formed with troughs 2 and sleeves 3 to receive the ends of the wire, which is fed through the sleeves in the usual manner, after the slack in the wire has been taken up with the usual blocks, the lower ends of the sleeves being open as indicated at 4, and the upper ends open as indicated at 4'.

The upper sides of the sleeves are somewhat higher than the central portion 5 of the hanger at which portion we provide a boss 6 which extends substantially throughout the width of the web 7 of the coupling. Each sleeve may be provided with a boss 8, for the reception of the usual clamp screw 9 which is adapted, in connection with the clamping ends of the coupling, the bending of the wires at their ends, and the wedging device which is preferably employed, to hold the ends of the wires firmly in the coupling. The lower edge of the coupling is provided with a bead 10, which, together with the bottoms of the troughs 2, forms a substantially straight under surface for the coupler. The ends of the trough are tapered off, so as to run gradually on to the under sides of the wire 11, so as to reduce the tendency of the bouncing of the trolley to a minimum. The troughs 2 are provided with slits 13 adjacent to the sleeves 3, which enables their upper edges to be bent or folded over the wire.

The boss 6 is provided with a socket 12 for the reception of the threaded portion 14 of a short headed bolt 15 which co-acts with a wedge plate 16 formed with a flat central portion 17 having an aperture 18 therein, and tapered wedge-members 19 normally arranged at a considerable angle to the flat part 17. The wedge portions 19 extend into the top of the coupling under the bent ends 20 of the wire, and when the bolt 15 is screwed down in the socket in the boss 6, it will force the ends 19 beneath the wire ends wedging the same firmly against the sleeves. By reason of the tapering formation of the upper openings 4' of the sleeves 3, and the tapering formation of the wedge portions 19, there will be a tendency of the ends 19 after they have engaged the under portions of the wires, to bow or lift up, thereby forcing the ends of the wires more firmly against the upper sides of the sleeves.

In Fig. 3 the wedge member 19 is the same as that shown in Fig. 1, but in this figure we have substituted for the bolt 15, a hanger-rod 21 adapted for use in catenary work, to which is added a flange or head 22 which may be round, square or hexagonal, as may be desired, its purpose being the same as that of the head of the bolt 15, that is to say, to be forced down upon the central portion of the wedge member to cause the wedge ends 19 to be extended beneath the bent ends 20 of the wire.

In making the splice, it being understood that the sides of the trough 2 are normally straight or approximately so, so that the wires may be let in from the top, the ends of the wire are run through the sleeves 3 after being drawn together by the usual blocks. The set screws 9 are then tightened (in cases where set screws are used) and the ends of the wire are bent to the position shown in Figs. 1, 2 and 3. The bolt 15 is then screwed down until its head forces the wedge ends 19 sufficiently under the bent ends of the wire. The end of the coupling is then tilted upwardly to bring the wire into one of the troughs 2, when the edges of the trough are bent or folded over it. The opposite end of the coupler is then tilted upwardly for the same purpose, when the coupling or splice is then complete.

Of course it will be obvious that the operations in coupling which we have just described need not necessarily take place in the order mentioned, as this will naturally depend upon the particular notion or fancy of the lineman making the repair, and it will also be obvious that we need not necessarily employ set screws 9, for the fact of gripping or clamping the wire in the troughs, bending its ends over the sleeves and clamping them, with the clamping wedge, will make a strong positive, and permanent coupling, but the set screws we prefer to use, as merely facilitating some of the coupling operations in some cases.

It will be noted that when the wire is clamped in the ends of the coupling, the wire will be brought at the point of entrance to the troughs substantially on a line with the bead 10, producing a smooth under-run.

Having thus described our said invention, what we claim is:—

1. A wire coupling comprising a member formed with a substantially straight under side, and a trough at each end normally open at the top, and inclined sleeves adjacent to said troughs and forming substantially a continuation thereof, said sleeves being open at their upper ends and provided with clamping screws to assist in holding the ends of the wire, the upper edges of the troughs being adapted to be bent or folded over the wire.

2. A wire coupling comprising a body having a substantially straight under side, and provided at its top with inclined sleeves open at both ends and troughs at the ends with open upper sides to receive the wire, there being slits in the sides of the trough adjacent to the lower ends of the sleeves, whereby the bending of the upper edges of the trough over the end of the wire is facilitated, and means for holding the ends of the wire in the sleeve.

3. A wire coupling comprising a member having a straight under side, and a straight upper central portion, and inclined sleeves open at both ends, the upper ends opening into the straight central portion of the member, a boss in the straight portion of said member and below the open upper ends of said sleeves, a trough at each end of the member with open upper sides to receive the wire, the upper edges of said troughs being adapted to be bent or folded over the wire, and clamp screws carried by the sleeves for holding the ends of the wire therein.

4. A coupling of the kind described, comprising a member having a substantially straight under surface, a flat central portion, a sleeve on each side of said flat portion, and opening into said portion, a boss in the central portion of the member, terminating at its upper end below the openings in the upper ends of the sleeves, a trough at each end of the member having slits in its sides adjacent to the lower open ends of the sleeves, the upper edges of the trough being adapted to bend or fold over the wire, and clamp screws carried by the sleeves for holding the ends of the wire in said sleeves.

5. In combination with a coupling of the kind described, having sleeves for the passage of the ends of the wire, of a clamping device having portions adapted to be simultaneously projected between the ends of the wire and the sleeves, to clamp said wire against the sleeves.

6. In combination with a coupling of the kind described, having sleeves for the passage of the ends of the wire, a clamping device having oppositely extending wedge members adapted to be simultaneously projected into the sleeves between the wire and the sleeves, to hold the wire in place and means for simultaneously forcing the wedge members to such position.

7. In combination with a coupling having sleeves for the reception of the ends of the wire, said sleeves being open at their upper ends, and a threaded socket between said open ends, of a wedge clamping member provided with oppositely extending wedge ends and a central aperture, and a headed bolt passing through said aperture into the said socket, whereby, when the bolt is moved downwardly, the wedge ends of the wedgeing member will be simultaneously projected between the wire and the sleeves, for the purpose set forth.

8. In combination with a coupling of the kind described, having sleeves for the reception of the ends of the wire, said sleeves being open at their upper ends, a threaded socket between said open ends, of a wedge clamping device comprising a central flat portion and two oppositely extending tapering wedge ends, said member being provided with an aperture, a headed bolt adapted to pass through said aperture and into the socket between the sleeve ends, whereby, when said head is drawn downward upon the wedge member, the wedge ends will be simultaneously projected between the wire and the sleeves to securely lock the same in place.

9. A wire coupling comprising a body having a substantially straight under side and provided at its top with inclined sleeves, open at both ends and inclined troughs at the ends with open upper sides to receive the wire, the sides of the troughs being adapted to be bent over the wire and when so bent, to form substantial continuations of the sleeves, whereby the wire from the points of entrance of the wires to the upper ends of the sleeves, will be supported upon a gradual incline.

In testimony whereof we affix our signatures in presence of two witnesses.

GEORGE W. ROBINSON.
MILTON E. HARDING.

Witnesses:
JAMES L. CRAWFORD,
TITIAN W. JOHNSON.

Copies of this patent may be obtained for five cents each, by addressing the "Commissioner of Patents, Washington, D. C."